(12) United States Patent
Walter et al.

(10) Patent No.: US 11,238,566 B2
(45) Date of Patent: Feb. 1, 2022

(54) IMAGE PROCESSING DEVICE, SYSTEM, AND METHOD FOR IMPROVING SIGNAL-TO-NOISE OF MICROSCOPY IMAGES

(71) Applicant: Leica Microsystems CMS GmbH, Wetzlar (DE)

(72) Inventors: Kai Walter, Schriesheim (DE); Florian Ziesche, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/858,836

(22) Filed: Apr. 27, 2020

(65) Prior Publication Data

US 2020/0349676 A1 Nov. 5, 2020

(30) Foreign Application Priority Data

Apr. 30, 2019 (EP) .................................. 19171800

(51) Int. Cl.
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10056* (2013.01)

(58) Field of Classification Search
CPC .. G06T 5/002; G06T 5/50; G06T 2207/10056
See application file for complete search history.

(56) References Cited

U.S. PATENT DOCUMENTS

| 2007/0109874 A1 | 5/2007 | Padfield et al. |
| 2007/0126730 A1 | 6/2007 | Goto et al. |
| 2007/0230760 A1 | 10/2007 | Omi et al. |
| 2015/0054970 A1 | 2/2015 | Hamada |
| 2018/0047138 A1 | 2/2018 | Mori et al. |
| 2020/0066395 A1* | 2/2020 | Watanabe ............... G02B 21/36 |
| 2020/0333251 A1* | 10/2020 | Howard ............... G02B 21/367 |

FOREIGN PATENT DOCUMENTS

| CN | 105589188 A | 5/2016 |
| JP | H9-37144 A | 2/1997 |
| JP | 2009-515533 A | 4/2009 |
| JP | 2015/41924 A | 3/2015 |
| WO | WO 2005/046478 A1 | 5/2005 |
| WO | WO 2016/123479 A1 | 8/2016 |

\* cited by examiner

*Primary Examiner* — Girumsew Wendmagegn
(74) *Attorney, Agent, or Firm* — Leydig, Voit & Mayer, Ltd.

(57) ABSTRACT

An image processing device for improving signal-to-noise of microscopy images includes a memory configured to store microscopy images at least temporarily, and processing circuitry configured to determine an output image based on a weighted rolling average of an ordered set of microscopy images stored in the memory. A method for improving signal-to-noise of microscopy images includes storing microscopy images at least temporarily, and determining an output image based on a weighted rolling average of an ordered set of the stored microscopy images.

12 Claims, 4 Drawing Sheets
(1 of 4 Drawing Sheet(s) Filed in Color)

IMAGE PROCESSING DEVICE, SYSTEM, AND METHOD FOR IMPROVING SIGNAL-TO-NOISE OF MICROSCOPY IMAGES

CROSS-REFERENCE TO PRIOR APPLICATION

Priority is claimed to European Patent Application No. EP 19171800.6, filed on Apr. 30, 2019, the entire disclosure of which is hereby incorporated by reference herein.

FIELD

The invention relates to an image processing device for improving signal-to-noise of microscopy images. The image processing device may be connected to a microscopy device such as a scanning microscope, a lightsheet microscope or a widefield microscope.

BACKGROUND

Capturing images of a specimen under a microscope suffers from numerous sources of image noise. A camera, for example a CCD, accumulates photons passing from the specimen through the microscopy system to produce information on radiation intensity emanating from points of the specimen. The image may be formed as a two-dimensional image frame when a large area of the specimen is illuminated and radiation emanating from the large area is captured by the camera. The image may also be formed point by point by a process of illuminating small spots of the specimen and detecting the emanating radiation by a point detector. An image may also be generated as a three-dimensional image by scanning a three-dimensional volume of a specimen. Alternatively, a three-dimensional image may be formed from a stack of two-dimensional image frames that have been captured by a camera or by a scanning process. To capture time-dependent processes, e.g. processes in living cells, stacks of subsequent microscopy images are generated. The stacks of microscopy images desirably have sufficient frame rate to resolve the time-dependent process under study.

Noise in microscopy images may arise from limitations of the microscopy system and from limitations of the imaging process in the camera. In particular, the statistical and accumulative nature of photon detection implies that the microscopy images suffer photon noise. Photon noise arises both from the intrinsic statistical variation in the detected photon signal which is governed by a Poisson distribution function, and from photon noise of background light such as stray light. Photon noise due to the intrinsic statistical variation in the detected photon signal could be reduced by collecting photons over a longer detection time span, which however conflicts with the goal to image with sufficient time resolution. Further sources of noise in microscopy images include detector noise, readout noise, thermal noise, and amplifier noise.

In particular, for confocal microscopy the photon number received is very small. The photons to be detected arise from fluorescence emission, which is a weak signal. Therefore, in confocal microscopy, photon noise due to the intrinsic statistical variation in the emitted photon signal is the main source of noise. Advances in construction of confocal microscopes allow scan speeds on up to 12 kHz so that microscopy images can be captured at video frame rate.

SUMMARY

In an embodiment, the present invention provides an image processing device for improving signal-to-noise of microscopy images. The image processing device includes a memory configured to store microscopy images at least temporarily, and processing circuitry configured to determine an output image based on a weighted rolling average of an ordered set of microscopy images stored in the memory.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Therefore, there is a need to improve signal-to-noise of microscopy images. The present invention overcomes at least some of the mentioned problems of the state of the art.

Embodiments of the present invention improve the signal-to-noise of microscopy images.

Embodiments of the present invention provide an image processing device for improving signal-to-noise of microscopy images. The image processing device comprises a memory configured for saving microscopy images at least temporarily and processing circuitry configured for determining an output image based on a weighted rolling average of microscopy images. The image processing device may produce, from ordered sets of microscopy images, a stack of output images having improved signal-to-noise. In particular, noise that is statistically independent between subsequent images, e.g. photon noise, is reduced in this manner due to statistical averaging, while the signal of the captured time-dependent process is preserved given that the frame rate of the microscopy image stack is large enough. At the same time, the calculation of the weighted rolling average preserves the frame rate of the microscopy images so that time resolution of the stack of output images is maintained.

In an embodiment of the image processing device, the weighted rolling average is computed by adding, to a given microscopy image, a number N of microscopy images from an ordered set of microscopy images to determine the output image, wherein the contribution of each added microscopy image from the ordered set of microscopy images to the output image is weighted by a weight, so that N+1 microscopy images are employed to determine the output image.

According to a further embodiment of the image processing device, the microscopy images of the ordered set of microscopy images are microscopy images previous to the given microscopy image, and the given microscopy image is the most recent microscopy image. For example, the ordered set of microscopy images may comprise N previous microscopy images from a stack of microscopy images. Employing previous microscopy images allows producing the output image in real time as soon as a new microscopy image has been captured. For example, the most recently determined output image may be displayed on a monitor simultaneous to the process of capturing further microscopy images.

According to a further embodiment of the image processing device, the set of microscopy images may comprise microscopy images captured both previously and more recently than the given microscopy image. In this embodiment, the determination of the stack of output images may be performed as a step of post-processing. The stack of output images produced by this embodiment has improved time resolution.

According to a further embodiment of the image processing device, the weight applied to a particular microscopy image, by which the microscopy image contributes to the output image, is determined as the power of a weighting factor g, where 0<g<1, and wherein the power is determined by the difference in order number between the particular microscopy image and the given microscopy image. When the particular microscopy image, having been captured at time-step k, is placed at order number k in the stack of microscopy images, and the given microscopy image, having been captured at time-step j, is placed at order number j in the stack of microscopy images, the difference in order number is |k−j|. For example, the contribution of the given microscopy image may be weighted with weight one, the contribution of the microscopy image previous to the given microscopy image, differing in order number from the given microscopy image by one, may be weighted by weight g, the contribution of the microscopy image following to the given microscopy image may be weighted by weight g, the contribution of the microscopy image second-last to the given microscopy image may be weighted by weight $g^2$, and so forth.

According to an embodiment, the weighting factor is $$g = e^{-\frac{1}{wN}},$$

where N is me total number of added microscopy images, and w is a constant, so that N+1 microscopy images are employed to determine the output image.

A further embodiment of the present invention is a system for improving signal-to-noise of microscopy images, the system comprising an image processing device according to one of the above embodiments and a detection device configured to capture the microscopy images.

According to another embodiment of the system, the detection device comprised in the system captures images of a specimen wherein the ordered set of microscopy images comprises N+1 microscopy images, wherein the number N is adapted to the movement of the specimen. For example, the specimen may be a living cell undergoing a biological process. In an embodiment, the adaption of the number N to the movement of the specimen is calculated by a processor comprised in the system, wherein the calculation is based on determining an optical flow.

According to another embodiment of the system, the weighted averaging may be based on a determined periodic movement of the specimen. According to this embodiment, the captured stack of microscopy images exhibits periodicity of the movement of the specimen such that microscopy images captured at time-steps j and j−M show a same phase of the periodic movement of the specimen, where M is a first period. According to this embodiment, the ordered set of microscopy images comprises microscopy images captured every first period M, so that the given microscopy image 102-0 may be captured at time j, the directly preceding added microscopy image may have been captured at time j−M, the next earlier added microscopy image may have been captured at time j−2M, and so forth.

According to another embodiment of the present invention, the system according to one of the previous embodiments further comprises a microscope configured to capture a specimen, and a monitor displaying the output image. In embodiments, the system may be a scanning microscope, a lightsheet microscope or a widefield microscope.

In an embodiment, the determination of the output image is performed while the camera is capturing the microscopy images and the given microscopy image is the microscopy image most recently captured by the camera.

According to a further embodiment, a method for improving signal-to-noise of microscopy images comprises storing microscopy images at least temporarily and determining an output image based on calculating a weighted rolling average of an ordered set of the stored microscopy images. In a further embodiment, the method may comprise computing the weighted rolling average by adding to a given microscopy image microscopy images from the ordered set of microscopy images, wherein, before adding to the given microscopy image, each microscopy image is weighted by a weight.

Systems and methods for improving signal-to-noise of microscopy images will be described in detail below. For purposes of explanation, examples and specific details are set forth in order to provide a thorough understanding of the embodiments of the present invention. Embodiments may include some or all of the features in these examples alone or in combination with other features described below and may further include modifications and equivalents of the features and concepts described herein. The following description will refer to FIGS. 1 to 3 explaining embodiments of the present invention in detail.

Figure 1A:
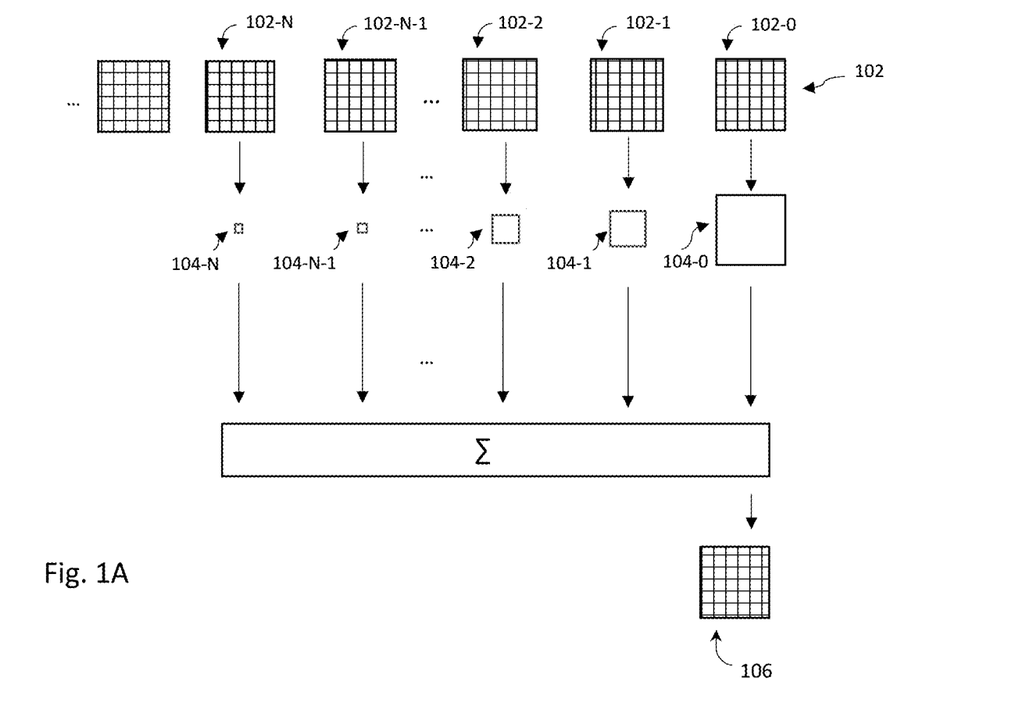
FIG. 1A illustrates the determination of an output image by calculating a weighted rolling average including N previous microscopy images.

FIG. 1A illustrates the determination of an output image 106 as a weighted average of N+1 microscopy images 102-0, . . . ,102-N. Each microscopy image 102-0, . . . , 102-N contributes to the output image 106 weighted by a respective weight 104-0, 104-1 . . . 104-N. The weights 104-0, 104-1 . . . 104-N may be real numbers. The microscopy images 102-0, . . . ,102-N may be a subset of a stack of microscopy images.

In an embodiment, the given microscopy image 102-0 contributes to the output image 106 by a weight of one, while the previous N microscopy images contribute with decreasing weights depending on the time lag between the respective microscopy image and the given microscopy image 102-0, as represented e.g. by a difference in order number. The weighted average is calculated for each microscopy image, respectively employing the N previous microscopy images, so that the frame rate of the output images 106 is the same as the frame rate of the stack of captured microscopy images.

For example, the stack of microscopy images may capture a fast process such that only microscopy images 102-2 to 102-0 show a relevant feature of this process. Because microscopy images 102-2 to 102-0 obtain higher weights than the more ancient microscopy images, the relevant feature can still be visible in the output image obtained by the weighted moving average.

In an embodiment, microscopy images 102-1, ..., 102-N are produced continually by a camera with a given frame rate. The frame rate is usually influenced by the image resolution of the microscopy images. At a typical resolution a frame rate of 90 fps may be achieved while at high resolution 22 fps and at extreme resolution, 0.01 fps may be achieved.

In embodiments, the number N may be between 1 and 65. In embodiments, the number N can be entered by a user. In other embodiments, the number N is determined based on the time dependent phenomenon captured in the microscopy images, for example, the movement of a biological specimen. In embodiments, the number N is 11.

Each of the microscopy images 102-0, ..., 102-N may be a multi-dimensional array $T_i$ indexed by a discrete time-step i. The microscopy images 102-0, ..., 102-N may be a subset of a stack of captured microscopy image arrays $\{T_i\}$. Microscopy image 102-0, taken at time-step j, may correspond to array $T_j$, microscopy image 102-1, taken at time-step j−1, may correspond to array $T_{j-1}$, microscopy image 102-2, taken at time-step j−2, may correspond to array $T_{j-2}$, and so forth. For example, the arrays $T_i$ may be two-dimensional arrays corresponding to light intensity data at two-dimensional discrete locations or three-dimensional arrays corresponding to light intensity data at three-dimensional discrete locations. Furthermore, the image may be available in a three color RGB format corresponding to three independent sets of two or three-dimensional arrays.

The contribution of the microscopy images 102-0, ..., 102-N to the output image may be obtained by multiplying the corresponding arrays $T_i$ by the real numbers corresponding to the weights 104-0, 104-1 ... 104-N. The output image may be determined by adding up the contributions of the microscopy images 102-0, ..., 102-N to obtain multi-dimensional arrays $T'_j$.

Consequently, the output image 106 has the same image data format as the microscopy images 102-1, ..., 102-N so that output image 106 is a multi-dimensional array $T'_j$ having the same dimension as the arrays $T_j$. The calculation of the output image $T'_i$ may be performed simultaneous to the capturing of the stack $\{T_i\}$ to produce a stack of output images $\{T'_i\}$ with improved signal-to-noise.

According to an embodiment, each of the weights 104-0, ..., 104-N may be determined as the power of a weighting factor g, wherein the power is determined by the difference i in order number between the microscopy image 102-0 and a respective microscopy image to which the weight is applied. Thus, referring to FIG. 1A, the weight 104-0 applied to microscopy image 102-0 may be $1=g^0$, the weight 104-1 applied to microscopy image 102-1 may be $g^1$, the weight 104-2 applied to microscopy image 102-2 may be $g^2$, and so forth, and the weight 104-N applied to microscopy image 102-N may be $g^N$. Thus, the output image 106 may be determined as an array $T'_i$ according to $$T'_j = \sum_{i=0}^{N} g^i T_{j-i} \quad (1)$$

In an embodiment, the weighting factor is $$g = e^{-\frac{1}{wN}}$$

where w is a constant. In embodiments, the constant w may be 0.4. According to other embodiments, w=2 or w=0.1. In embodiments, the constant w may be entered by a user. In further embodiments, the constant w may be adapted to the time dependence of the process captured by the microscopy images as determined by analyzing the optical flow of the microscopy images.

Figure 1B:
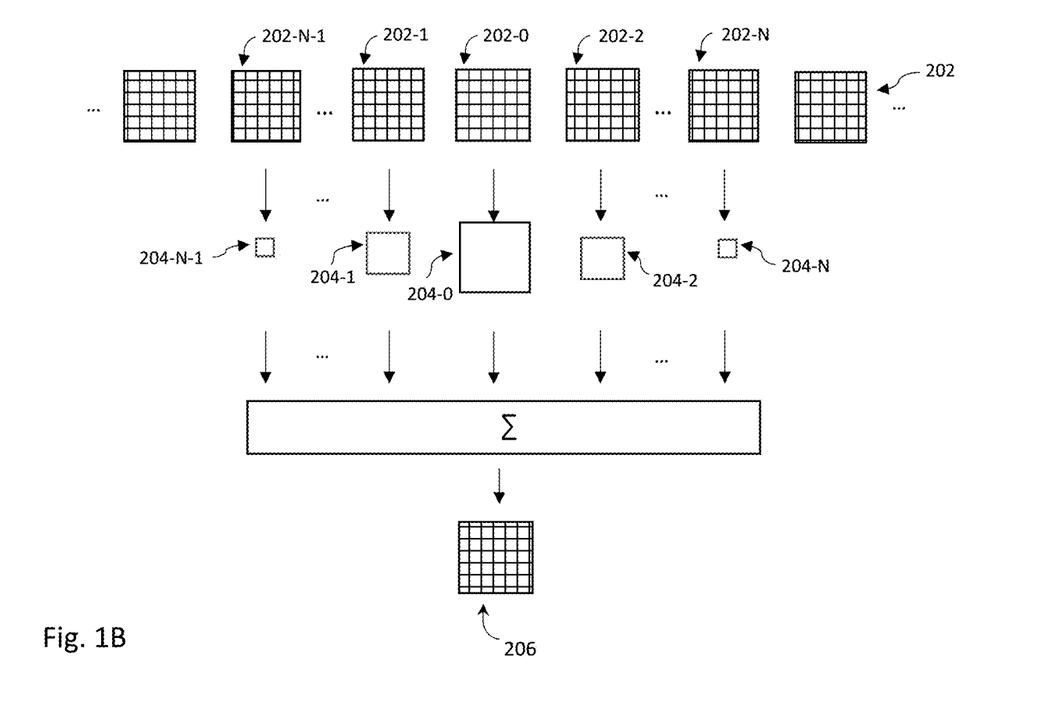
FIG. 1B illustrates the determination of an output image from calculating a weighted rolling average including a total of N additional microscopy images both previous and subsequent the given microscopy image.

While the determination of the output image according to FIG. 1A employs N previous microscopy images and therefore can be performed as soon as microscopy image 102-0 has arrived, FIG. 1B illustrates forming a moving weighted average employing microscopy images both previous and more recent than a given microscopy image 204-0. Therefore, the calculation of the output image 206 may be performed as a step of post-processing of an image stack.

Similar to the calculation illustrated in FIG. 1A, the output image 206 determined according to FIG. 1B is calculated by weighted contributions of the microscopy N+1 images 202-0, 202-1, 202-2, ..., 202-N−1, 202-N, wherein each microscopy image is weighted by a respective weight 204-0, 204-1, 204-2, ..., 204-N−1, 204-N. In FIG. 1B, N is an even number and all microscopy images having an even order number, 202-2, 202-4, ..., 202-N, are microscopy images more recent than the given microscopy image 202-0, while the microscopy images having an odd order number, 202-1, 202-3, ..., 202-N−1, have been captured previous to the given microscopy image 202-0.

The weights applied to the microscopy images may be determined by the difference in order number between the respective microscopy image and microscopy image 202-0 so that, in particular, the weight 204-1 is identical to the weight 204-2, the weight 204-3, is identical to 204-4, and weight 204-N−1 is identical to weight 204-N.

Thus, the output image 206 may be determined as an array $T'_j$ of the same shape as the arrays $T_j$ corresponding to the microscopy images 202 according to $$T'_j = \sum_{i=-N/2}^{N/2} g^{2|i|} T_{j+i} \quad (2)$$

The calculation of the output image according to Eq. (2) may be performed as post-processing. The determination of the weighted moving average according to Eq. (2) improves time resolution of processes captured in the microscopy images.

By calculation of the moving average more detected photons are employed to produce the output image 106, 206. As a consequence, noise which is statistically independent between the microscopy images 102, 202 is reduced in the output image 106, 206 so that signal-to-noise of the output image 106, 206 is improved.

Figure 2:
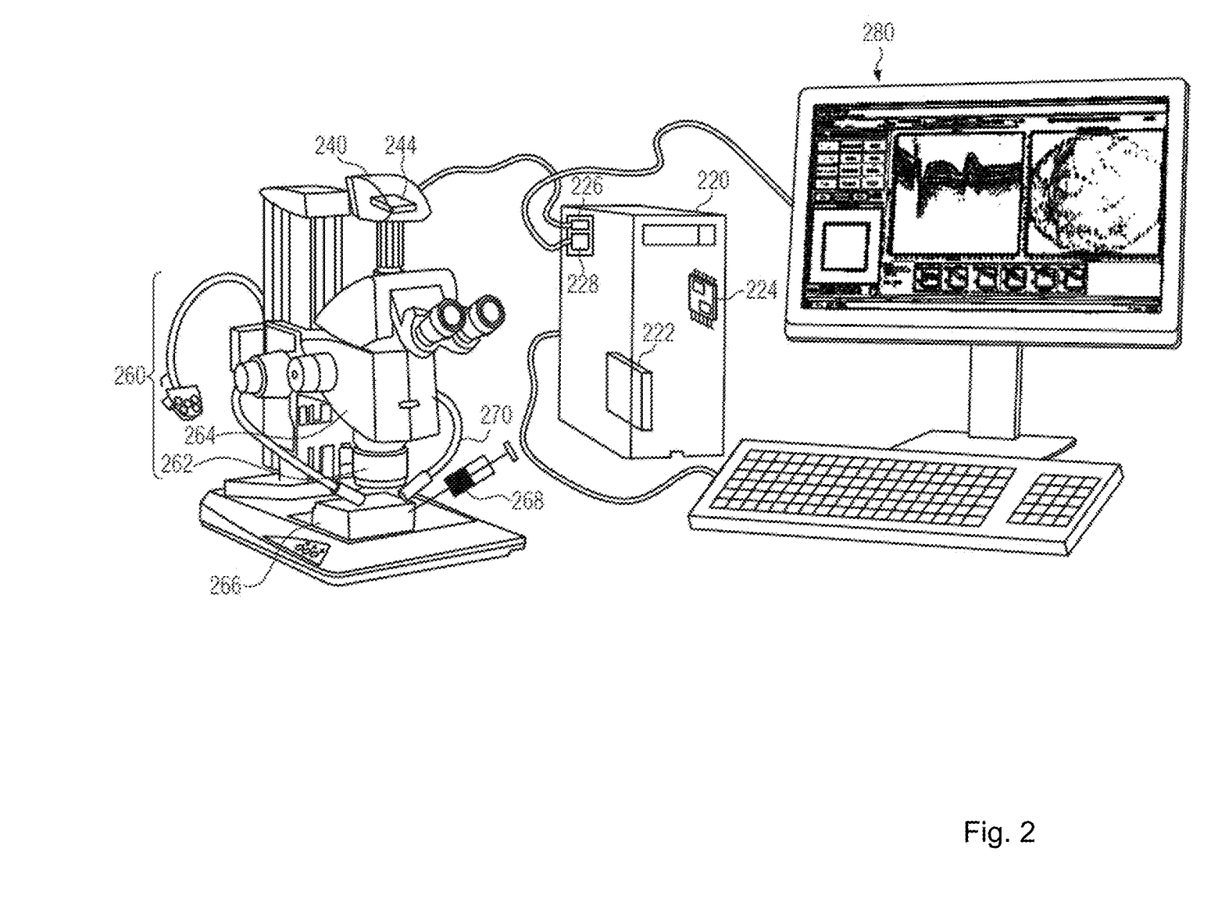
FIG. 2 shows a representation of a system for improving signal-to-noise of microscopy images according to an embodiment of the invention.

FIG. 2 displays a system 200 for improving signal-to-noise of microscopy images comprising an image processing device for improving signal-to-noise of the microscopy images. The image processing device 220 may comprise a memory 222 or an image storage section configured for saving microscopy images, at least temporarily, and processing circuitry 224 configured for determining an output image 106, 206 based on a weighted rolling average of an ordered set of microscopy images stored in the memory or the image storage section. For example, memory 222 may store microscopy images 102-0, . . . ,102-N, or microscopy images 202-0, . . . ,202-N. The determination of the output image 106, 206 by the processing circuitry 224 may be performed according to the calculations explained with reference to FIGS. 1A and 1B. The processing circuitry 224 may be a general purpose CPU executing software for determining the output image as explained above. According to another embodiment, the processing circuitry may be implemented as a field-programmable gate array (FPGA) comprising programmable logic blocks configured for performing the calculation of the output image by a weighted rolling average as described above. According to a further embodiment, a part of the determination of the output image 106, 206 is performed by software executed on a CPU, while another part of the calculation is performed by an FPGA.

The image processing device 220 may also include a further general-purpose CPU, an input/output interface, and a storage medium.

The system may further comprise detection device 240 and input connection means 226 connecting image processing device 220 to the detection device 240. The detection device 240 comprises an image sensor 244 configured to capture the microscopy images. In embodiments, the image sensor may be a CCD or a CMOS chip. The image sensor may be a multispectral, or hyperspectral camera, which records in a plurality of channels. In other embodiments, the detection device includes a scanner that scans a spot over specimen and a point detector detecting light emitted from the spot. The point detector may be a photomultiplier tube.

The system shown in FIG. 2 may further comprise a microscope 260 being configured to capture the specimen. According to embodiments, the microscope may be a scanning microscope, a lightsheet microscope, or a widefield microscope. The scanning microscope may be a confocal microscope, a multiphoton microscope, or a STED microscope. The scanning microscope may employ acousto-optical elements for excitation control and excitation emission separation, and resonant galvanometers, allowing a scan at frequencies of up to 12 kHz. The microscope 260 may comprise illumination 264, 270, lens 262 and may be configured to view specimen object 266.

In embodiments, scanning a spot over a specimen may comprise scanning along a scan line in a first direction and shifting the scan line in an orthogonal direction after scanning the scan line has been completed. In embodiments, scanning a spot over specimen may comprise dyeing the specimen with fluorochromes 268 and exciting the fluorochromes by a laser and detecting fluorescence signals by the point detector. In embodiments, scanning a spot over the specimen comprises switching the laser to excite another fluorochrome. In an embodiment, the exciting laser may be switched with every completed scan line. In another embodiment, the exciting laser may be switched after scanning a two-dimensional image has been completed. After scanning a two-dimensional image has been completed, hardware parameters of the scanning microscope may also be changed.

In embodiments, the scanning microscope may be a confocal microscope employing pinhole apertures that limit the optical beam path such that only fluorescence light emitted from a small volume reaches the detector.

In embodiments, the detection device captures two-dimensional microscopy images from a resonant scanning microscope at 12 kHz. At an image resolution of 512×512 px a frame rate of the output image stack of 21.9 fps may be reached, while at image resolution of 256×256 px a frame rate of 41.1 fps and at image resolution of 128×128 px a frame rate of 73.17 fps may be reached.

The system shown in FIG. 2 may also comprise monitor 280 displaying the output image and output connection means 228 connecting the image processing device 220 to the monitor.

According to an embodiment, the number N of microscopy images employed for the calculation of the moving average may be determined based on calculating the optical flow of the ordered set of microscopy images. Determining the optical flow may comprise identifying edges in the microscopy images and determining the movement of the specimen by the shift in the identified edges. The determined optical flow may be employed to adapt the number N and/or the constant w determining the weighting factor according to an embodiment as explained above. According to another embodiment, methods of artificial intelligence and/or deep learning may be employed to determine optimal numbers N and constants w.

In another embodiment, the movement of the specimen is periodic such that, for example, every $K^{th}$ captured microscopy image captures a same phase of the periodic movement of the specimen. In this embodiment, the ordered set of microscopy images employed for the calculation of the output image may comprise microscopy images separated by K−1 microscopy images. Accordingly the output image is calculated according to $$T'_j = \sum_{i=0}^{N} g^i T_{j-iM} \qquad (3)$$

Alternatively, the output image in this embodiment may also be calculated, as explained above with reference to FIG. 1B, using microscopy images both previous and more recent than a given microscopy image according to $$T'_j = \sum_{i=-N/2}^{N/2} g^{2|i|} T_{j+iM} \qquad (4)$$

According to an embodiment, the determination of the output image may be performed simultaneous to the capturing of the microscopy images by the camera such that the given microscopy image 102-0 of FIG. 1A is the microscopy image most recently captured by the camera. Thereby, the output images can be displayed on the monitor 280 immediately after calculation of the moving average has been completed.

Figure 3:
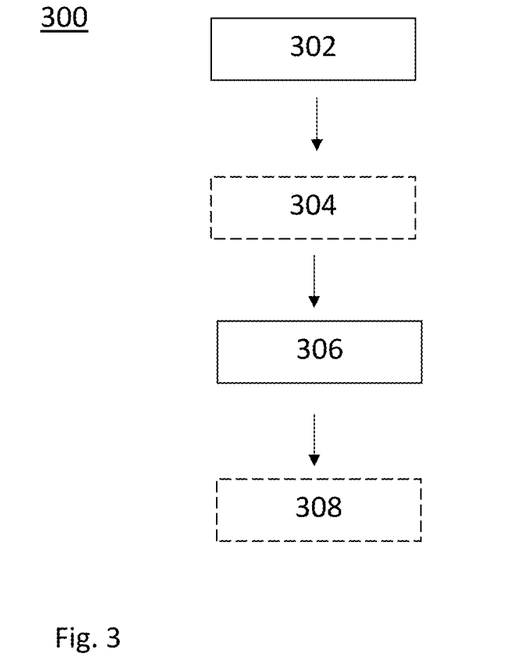
FIG. 3 shows a flowchart of a method for improving signal-to-noise of microscopy images according to an embodiment of the invention.

FIG. 3 illustrates a flow diagram of a method for improving signal-to-noise of microscopy images. The method comprises storing 302 microscopy images at least temporarily. The method may optionally comprise determining 304 the parameters of the weighted moving average, for example, the parameters N and w of Equations (1-4). The method further comprises determining 306 an output image based on a weighted rolling average of an ordered set of the stored microscopy images, for example, by a calculation according to Equations (1-4). The method 300 may comprise computing the weighted rolling average by adding to a given microscopy image, microscopy images from an ordered set of microscopy images, wherein each microscopy image is weighted by a weight. The method 300 may optionally further comprise displaying 308 the determined output image on a monitor.

Figure 4A:
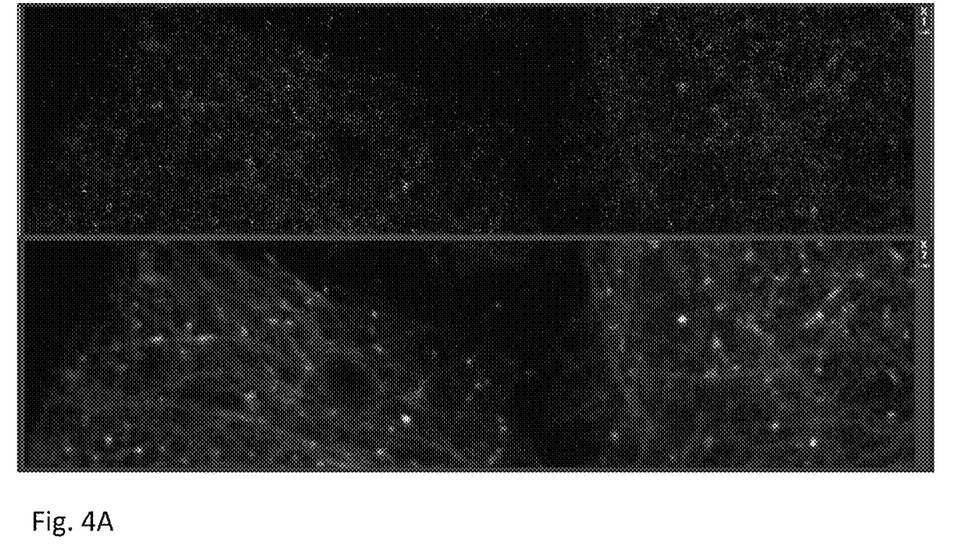
FIGS. 4A and 4B reproduce microcopy images and output images with improved signal-to-noise obtained from a weighted moving average according to embodiments of the invention.
Figure 4B:
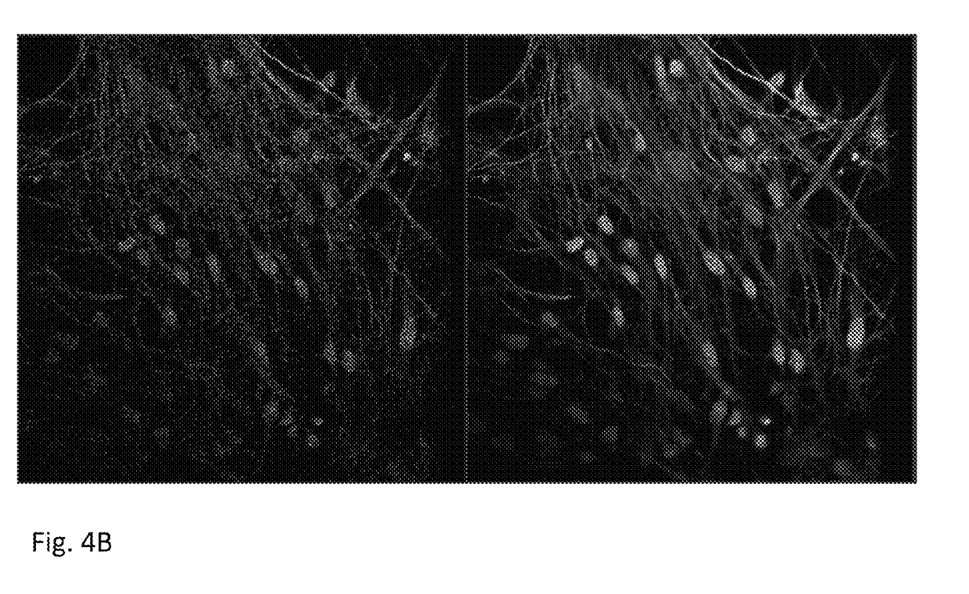

FIGS. 4A and 4B show comparisons of microscopy images, e.g. microscopy images 102 or 202 and output images obtained by weighted rolling averaging, e.g. output images 106, 206. The upper panel of FIG. 4A reproduces a two-dimensional microscopy image having dimension of 1024×1024 px of actin filaments, as captured by Leica TCS SP8 STED microscope. The images are captured with a voxel size of 33 nm. The filaments shown in the microscopy image of the upper panel of FIG. 4A are barely visible due to photon noise. The lower panel of FIG. 4A reproduces an output image generated as a weighted moving average according to the teachings of the present invention, where the filaments are clearly visible due to the averaging of the photon noise and the collection of more photons. The weighted moving average is calculated according to Eq. (1), employing N=11, w=0.4.

FIG. 4B shows a similar comparison for microscopy images of mouse neurons captured by a Leica SP8 STED microscope, the images having a dimension of 512×512 px. The images are captured with a voxel size of 289 nm. While the cells and filaments shown in the left panel of FIG. 4B are dominated by noise, the image of the right panel of FIG. 4B, calculated according to the weighted moving average according of Eq. (1), employing N=11, w=0.4, shows the cells and filaments significantly more clearly.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by or using a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate or are capable of cooperating with a programmable computer system such that the respective method is performed.

Therefore, the digital storage medium may be computer readable. Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier. Other embodiments comprise the computer program for performing one of the methods described herein, stored on a machine readable carrier. In other words, an embodiment of the present invention is, therefore, a computer program having a program code for performing one of the methods described herein, when the computer program runs on a computer.

A further embodiment of the present invention is, therefore, a storage medium or a data carrier, or a computer-readable medium comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein. A further embodiment comprises a computer having installed thereon the computer program for performing one of the methods described herein.

A further embodiment according to the invention comprises an apparatus or a system configured to transfer for example, electronically or optically a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device for example, a field programmable gate array may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 102-0, . . . ,102-N microscopy image
104-0, . . . ,104-N weight
106 output image
202-0, . . . ,202-N microscopy image
204-0, . . . ,204-N weight
206 output image
220 image processing device
222 memory
224 processing circuitry
226 input connection means
228 output connection means
240 detection device
244 image sensor
260 microscope
264 illumination
270 illumination
262 lens
266 specimen object
268 fluorochrome
280 monitor

The invention claimed is:

1. An image processing device for improving signal-to-noise of microscopy images, the image processing device comprising:
a memory configured to store microscopy images at least temporarily; and
processing circuitry configured to determine an output image based on a weighted rolling average of an ordered set of microscopy images stored in the memory,
wherein the weighted rolling average is computed by adding, to a given microscopy image, microscopy images of the ordered set of microscopy images, wherein each added microscopy image is weighted by a weight, and
wherein the weight of a respective one of the microscopy images is determined as a power of a weighting factor, and wherein the power is determined by a difference in order number between the respective one of the microscopy images and the given microscopy image.

2. The image processing device of claim 1, wherein the microscopy images of the ordered set of microscopy images are microscopy images previous to the given microscopy image.

3. The image processing device of claim 1, wherein the microscopy images of the ordered set of microscopy images comprise a first number of microscopy images previous to the given microscopy image and a second number of microscopy images later than the given microscopy image.

4. The image processing device of claim 1, wherein the ordered set of microscopy images comprises N+1 microscopy images and wherein the weighting factor is $$e^{-\frac{1}{wN}},$$

where w is a constant.

5. A system for improving signal-to-noise of microscopy images, the system comprising:
the image processing device of claim 1; and
a detection device comprising an image sensor or a point detector configured to capture the microscopy images.

6. The system of claim 5, wherein the detection device is configured to capture the microscopy images of a specimen, wherein the ordered set of microscopy images comprises N+1 microscopy images, and wherein the number N is adapted to a movement of the specimen.

7. The system of claim 6, wherein the number N is based on a determined optical flow of the ordered set of microscopy images.

8. The system of claim 6, wherein the movement of the specimen is periodic with a first period, and wherein the ordered set of microscopy images comprises microscopy images captured once every first period.

9. The system of claim 5, further comprising:
a microscope configured to capture a specimen; and
a monitor configured to display the output image.

10. The system of claim 9, wherein the microscope is a scanning microscope, a lightsheet microscope, or a widefield microscope.

11. The system of claim 9, wherein the detection device comprises a camera, wherein a determination of the output image is performed while the camera is capturing the microscopy images, and wherein the given microscopy image is the microscopy image most recently captured by the camera.

12. A method for improving signal-to-noise of microscopy images, the method comprising:
storing microscopy images at least temporarily; and
determining an output image based on a weighted rolling average of an ordered set of the stored microscopy images,
wherein the weighted rolling average is computed by adding, to a given microscopy image, microscopy images of the ordered set of microscopy images, wherein each added microscopy image is weighted by a weight, and
wherein the weight of a respective one of the microscopy images is determined as a power of a weighting factor, and wherein the power is determined by a difference in order number between the respective one of the microscopy images and the given microscopy image.

* * * * *